April 30, 1963     W. A. VAN DER WILT     3,087,706
SPRING COMPRESSOR
Filed Dec. 1, 1960
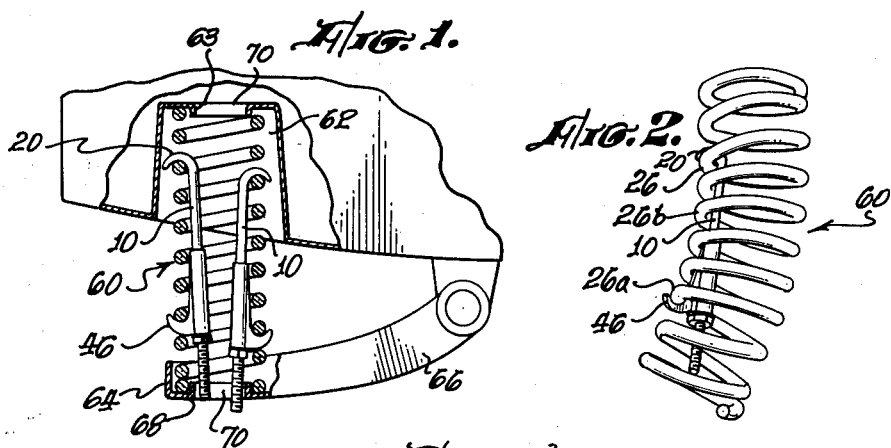
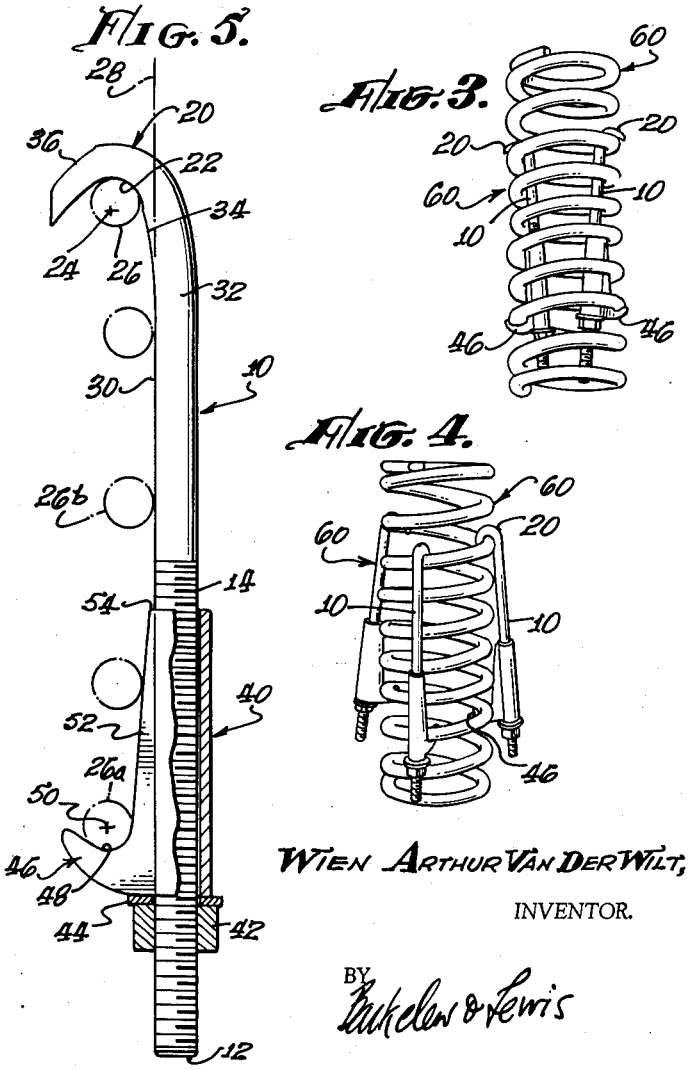
WIEN ARTHUR VAN DER WILT,
INVENTOR.

United States Patent Office 3,087,706
Patented Apr. 30, 1963

3,087,706
SPRING COMPRESSOR
Wien Arthur Van Der Wilt, 320 Lafayette St.,
Glendale 5, Calif.
Filed Dec. 1, 1960, Ser. No. 72,979
1 Claim. (Cl. 254—10.5)

This invention relates to devices adapted for compression of helical springs, for removal from and replacement on their end mountings. The form of compressor typical of the invention, to be here described, has been particularly designed for compressing helical springs such as those used in automobile suspensions. The invention is particularly useful for manipulating such heavy springs, which, because of their necessary spring strength and spring rate, are very difficult to remove and replace even when relieved of their normal load.

The general objects of the invention are the provision of a simple, strong and rugged compressor device that is easily applied and manipulated. The features of the invention that accomplish such objectives will be understood from the following descriptions of a preferred and illustrative embodiment, with reference to the accompanying drawings, in which:

FIG. 1 is a sectional schematic illustrating typical use of the compressor on an automobile suspension spring;

FIGS. 2, 3 and 4 are views showing various uses of the compressor;

FIG. 5 is an elevation, with parts in section, showing the typical compressor; and FIG. 6 is an exploded view of the compressor of FIG. 5.

Referring first to FIGS. 5 and 6, the illustrative compressor as there shown has a shank 10 of cylindric-rod form, screw threaded from one end 12 for about half its length. In typical size for compressing suspension springs, shank 10 is of ½ inch diameter, over-all length of about 10 inches, with threads 14 extending about 5½ inches from end 12.

At the other end of shank 10 there is an integral hook formation 20 that has an internal concave contour at 22 of a radius at least as large as the sectional radius of a coil of the heaviest spring to be operated on. The center of concave contour 22 is located at 24, and the relative position in the hook of the cross-section of a large spring coil element is indicated at 26. Center 24 is off-set from plane 28 by a distance substantially greater than the radius of curvature of contour 22. In this relative position of the hook contour 22, any spring coil taken by the hook at 26 is well spaced from the plane 28 of that side or face 30 of the shank that faces the hook formation. To effect the offset of hook center 24 from that side of the shank, the latter is bent at a point such as 32 so that a relatively sloping part 34 of shank face 30 leads directly to the concave hook contour 22. That sloping face formation aids in guiding a spring element 26 to its position in the hook. The outer end of the hook formation is flattened as at 36, to facilitate entry of the hook between spring coils.

A sleeve 40 is carried by the shank on its threaded portion, freely slidable and rotatable on the shank. Behind the sleeve (under it as here shown) a threaded nut 42 screws on shank threads 14, with an interposed washer 44. Sleeve 40 also carries an integral hook formation 46 with a concave inner contour 48 facing the other hook contour 22. The two concave contours are alike. The center 50 of that hook contour 48 is located at 50, also spaced from shank plane 28 by a distance greater than the radius of curvature of 48; again with the result that any spring coil as at 26a taken by hook 46 will be well spaced from shank plane 28. A sloping face 52 on sleeve 40 leads directly to the concave hook contour 48. The end 54 of sloping face 52 is located close to the shank face plane 28; again to form an easy guide for a spring coil into hook 46.

All parts of the compressor are of high strength steel, and nut 42 is of the self-lubricating type to insure easy running on the threads.

The purpose and effect of the relative positionings of the hook contours will be apparent from the following.

A typical mounting of a suspension spring 60 is schematically shown in FIG. 1 with its upper end in a frame recess 62 seated around a seat flange 63, and its lower end recessed at 64 into the end of a suspension arm 66 and surrounding a seat flange 68. In such a mounting spring 60 has to be compressed in length sufficiently to lift it off 68 and out of 64. Openings 70 in the seatings allow access to the inside of the spring.

To compress a spring straight, two or three compressors may be used. Two are shown operating in diametrically opposite positions inside the spring in FIGS. 1 and 3; three equally-spaced operating on the outside in FIG. 4. The free rotation of sleeve 40 and its hook 46 on the shank facilitate engagement of that hook with a spring coil after hook 20 has been engaged; nuts 42 being initially set up by hand. After that initial nut setting, they may be forcibly set up by any suitable tool; e.g., a long socket reaching in through an opening 70. With the spring sufficiently compressed to clear at least one seat it may then be easily removed; or, compressed in length, it may be easily replaced or a new one inserted, and then released from compression.

In some types of spring mountings it is necessary, or desirable, for ease in removing and replacing such springs, that they be compressed non-symmetrically to take such a bent compressed form as shown for instance in FIG. 2. For such an operation a single compressor is used; and in many instances is applied, or can only be applied, inside the spring, as shown in that figure. With hooks 20 and 46 forcibly compressing that one side of the spring, it takes the general curved shape shown in the figure, with the spring coils, such as that at 26b between the two hook engaged coils 26 and 26a, displaced toward shank 10. The previously described offset of shank face 30 from the hook centers 24 and 50, and the slopes at 34 and 52, allow that coil displacement and thus allow the compressed spring to take the desired warped form of FIG. 2. The relative displacements of the spring coils between 26 and 26a are indicated in FIG. 5.

I claim:

A spring compressor comprising in combination an elongate shank in the general form of a cylindric rod with an integral hook formation projecting laterally from the shank at one end, said hook formation having an inner concave contour facing toward the other end of the shank with the center of the concave contour laterally spaced from the plane of the adjacent shank face by a distance greater than the radius of that contour, the shank being straight in the major portion of its length and having near its hook formation a sloping face on its side adjacent its hook formation leading directly to the inner concave contour of its hook, the shank being screw-threaded for a distance from its other end, an elongate sleeve freely slidable and rotatable on the threaded part of the shank, said sleeve carrying at its end removed from the shank hook an integral hook formation laterally projecting from one longitudinal sleeve face, said last mentioned hook formation having an inner concave contour facing the first mentioned hook formation with the center of its contour laterally spaced from the face of the shank by a distance greater than the radius of that contour, the sleeve having a sloping face on its side adjacent its hook formation leading from a point close to the shank at its other end directly to the inner concave contour of its hook formation and a nut threaded on the shank for forcing the sleeve and its hook formation toward the first hook formation.

References Cited in the file of this patent

UNITED STATES PATENTS

| | | |
|---|---|---|
| 775,355 | Smith | Nov. 22, 1904 |
| 1,285,517 | White | Nov. 19, 1918 |